United States Patent Office 2,868,858
Patented Jan. 13, 1959

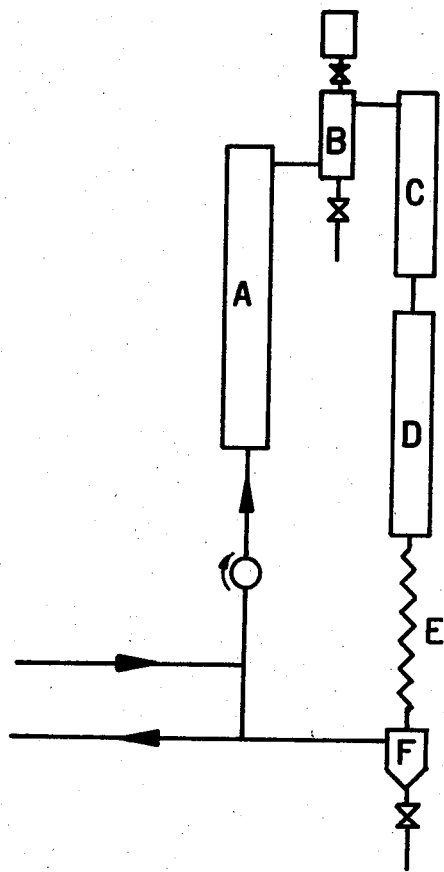

2,868,858

PROCESS FOR OBTAINING OLEFINES DIRECTLY FROM ALPHA, BETA-UNSATURATED ALDEHYDES

Clito Capitani, Milan, and Elso Mugnaini, Novara, Italy, assignors to Società Rhodiatoce S. p. A., a corporation of Italy Application December 15, 1955, Serial No. 553,365

Claims priority, application Italy December 17, 1954

6 Claims. (Cl. 260—682)

The present invention relates to a process for obtaining olefines. More specifically, the invention relates to a process of obtaining olefines directly from unsaturated aldehydes, by means of catalytic hydrogenation.

Monolefines have been obtained in the past by means of several different methods; one of the most important is the thermal decomposition (cracking) of petroleum, natural gases and various organic substances, whereby simultaneously light and heavy olefines are obtained. The lightest olefines are thereby found in the cracking gas, the heaviest in the liquid cracking fractions, but separation is usually not accomplished, because it is not easily attainable.

In order to produce medium weight and heavy olefines, the lighter fractions may be polymerized but, generally, the products obtained are mixtures of various polymers that are scarcely separable into commercially pure products.

In order to obtain olefines of a definite structure for further chemical conversion, other methods of preparation are available, such as: dehydration of alcohols, dehydrogenation of saturated mono-halogen derivatives (generally, chloroderivatives), dehalogenation of saturated di-halogen derivatives.

Still other chemical methods have not been used to any extent in the industrial field, because they are not sufficiently practical.

Among the above-mentioned methods, the first two, namely (a) dehydration of alcohols in the presence of catalysts such as silica, alumina, thorium oxide, tin dioxide, aluminum silicate, graphite, aluminum phosphate, inorganic sulfates or aromatic amine-sulfates, as well as phosphorus pentoxide, boric anhydride, sulfuric acid or sulfonic acids, zinc chloride and others, and (b) dehydrohalogenation of monohalogen derivatives, carried out at high temperatures, in the presence of aluminum silicate, clays, soda-lime or barium oxide, are the most important for industrial purposes.

Among the olefines, those with 4 carbon atoms or more are particularly important as basic products for aromatic hydrocarbons and the preparation of synthetic lubricants.

Ethylhexene (octene), for example, i. e. a monolefine having 8 carbon atoms, may be readily converted into p-xylene (U. S. Patent No. 2,363,768—1944), which, in turn, may be made into terephthalic acid, an important basic product for the preparation of a synthetic fiber called "Terylene."

Olefines of the type of ethylhexene may be obtained by the dehydration of branched chain alcohols. This reaction is highly facilitated whenever the carbon atom, to which the alcoholic group is bound, is attached to a secondary or tertiary carbon atom.

Thus, if alcohols of general formula

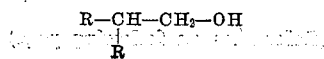

wherein R represents hydrogen or an alkyl or an aryl group, are caused to pass over a dehydrating catalyst, the corresponding unsaturated hydrocarbon

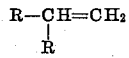

is formed, mixed, however, with isomers, due to an internal transmigration of the double bond.

We have now discovered that mono-olefines may be obtained directly, without any intermediate reaction, from alpha,beta-unsaturated aldehydes of the type

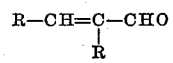

wherein R represents hydrogen or an alkyl or an aryl group, by means of a catalyst acting simultaneously as hydrogenating and dehydrating agent.

According to the process of the present invention, mono-olefines may be obtained directly, upon causing an unsaturated aldehyde of the afore-mentioned type to pass, together with an excess of hydrogen and at a temperature between 150° and 350° C., over a catalyst, made up substantially of reduced copper silicate, that acts simultaneously as hydrogenating and dehydrating agent.

The method of hydrogenating an unsaturated aldehyde, namely crotonaldehyde, has been previously known. However, in contrast to the unsaturated products of the present invention, hydrogenation of crotonaldehyde results in saturated products, such as butyraldehyde and butyl alcohol.

It is also known to hydrogenate saturated and unsaturated aliphatic aldehydes and ketones, in general all compounds having an ethylenic group, with a freshly reduced copper catalyst, but the references relate only to saturated end products obtained in this manner.

Other, previously published methods relate to the hydrogenation of ethyl-propyl-acrolein with Raney nickel, whereby, however, also only saturated products are obtained (alpha-ethylhexaldehyde and ethylhexanol or, upon further oxidation, alpha-ethylhexoic acid).

Therefore, it was entirely unexpected that unsaturated compounds, namely olefines, can be obtained from alpha, beta-unsaturated aldehydes by a hydrogenation process catalyzed by means of reduced copper compounds or reduced copper compounds in the presence of dehydrating activators.

It is, therefore, the object of the present invention to prepare olefines directly from alpha-beta-unsaturated aldehydes in the afore-mentioned manner which affords a number of advantages over prior methods of preparing olefines:

(i) Because of the decreased number of process steps, particularly because the preparation of intermediates is eliminated, the operation is quick and simple.

(ii) The process is carried out at an economical thermal balance, because the heat developed during hydrogenation is recovered in the dehydration, (iii) The operating temperature is relatively low, so that there is no substantial saturation of the double bond.

The starting materials are alpha, beta-unsaturated aldehydes of the type

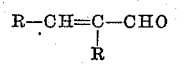

wherein R represents hydrogen or an alkyl or aryl group.

The catalyst is made up of extruded bodies or comminuted particles of conveniently reduced copper silicate or oxide, or the same reduced copper silicate or oxide are provided with a silica carrier to which, for the purpose of activation, substances having dehydrating properties may be added, such as silica, aluminum oxide or aluminum silicates, aluminum phosphates, graphite, inorganic sulfates or sulfates of aromatic amines, and others.

In carrying out this process, it is preferable to use hydrogen of high purity, which, if possible, is free from $CO_2$, CO, S, etc. as to increase the catalyst activity and extend the life of the catalyst.

The operating temperature is preferably held within a range of 150° to 350° C., and the feeding rate at 0.05 to 1 volume per hour of liquid material per volume of catalyst.

The process may be carried out in one of the common vapor phase hydrogenation devices, such as illustrated in the accompanying drawing. The starting product is vaporized in a vaporizer B, where it comes into contact with a flow of hydrogen, heated in a special preheater A. Vapors of the starting material, intimately mixed with hydrogen, first pass into another preheater C, and then through the catalytic chamber D. Finally, the reaction mixture, after condensation in a cooler E is collected in a collector F. Unreacted hydrogen is recycled, according to known procedures.

The following examples of performing the process of the present invention are presented to illustrate, but not to limit the scope of the present invention in any manner. These examples describe a process for obtaining ethylhexene (octene) directly from ethyl-propyl-acrolein, in the presence of a catalyst of the afore-described type. Unless otherwise stated, all parts mentioned are parts by weight.

Example 1

170 parts of ethyl-propyl-acrolein, mixed in vapor phase with 5 times the stoichiometric amount of hydrogen, are caused to pass, during a period of 2 hours and at a temperature of 250° C., through a catalytic chamber, charged with 500 cc. of a catalyst comprising a reduced copper silicate. The liquid collected upon cooling (about 175 parts), separates into 2 layers; the smaller layer (about 15 parts) comprises water, set free during the reaction; the larger layer provides, upon fractionation:

85 parts of a product which boils at 114°–123° C., and has an octene concentration of 98%,
18 parts of a mixture of ethylhexanal and ethylhexanol,
51 parts of ethylhexanol,
6 parts of a distillation residue that still contains some ethylhexanol.

Upon further distillation, the product, collected between 114° and 123° C., furnishes octene at a state of relatively high purity which can be readily used in a number of important syntheses, such as previously mentioned.

Example 2

Example 1 is repeated, except that the feeding rate is reduced to one-half. 176 parts of a liquid are collected which separates into two layers. The smaller layer (about 21 parts) is formed almost entirely of water liberated during the reaction. The larger layer produces, upon fractionation, 125 parts of a product which boils between 114°–123° C., and has an octene concentration of 92%. The residue (about 30 parts) is formed almost exclusively of ethylhexanol.

Example 3

Example 1 is repeated, except that the temperature is raised to 275° C. and the catalyst comprises a mixture of 4 parts of reduced copper silicate and 1 part of alumina.

About 175 parts of a liquid are collected that separates itno 2 layers. The smaller layer represents about 18 parts of water; the larger layer, upon fractionation, splits into:

110 parts of a product boiling between 114°–123° C., and having an octene content of 98%,
13 parts of a mixture of ethylhexanal and ethylhexanol,
28 parts of ethylhexanol,
6 parts of a residuum still containing ethylhexanol.

We claim:

1. The process of preparing an olefine from an alpha, beta-unsaturated aldehyde of the type

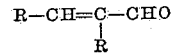

wherein R represents hydrogen, alkyl and aryl, which comprises treating an aldehyde of said type in the vapor phase and at atmospheric pressure with hydrogen, in the presence of a hydrogenation catalyst selected from the group consisting of reduced copper silicate and oxide admixed with a dehydrating agent selected from the group consisting of alumina, silica, thorium oxide, tin dioxide, inorganic sulfates, sulfates of organic amines, zinc chloride, aluminum silicate, graphite, aluminum phosphates, phosphorus pentoxide, boric anhydride, sulfuric acid and sulfonic acids.

2. The process of preparing an olefine from an alpha, beta-unsaturated aldehyde of the type

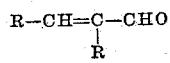

wherein R represents hydrogen, alkyl and aryl, which comprises treating an aldehyde of said type in the vapor phase and at atmospheric pressure with from 1 to 20 times the stoichiometric amount of hydrogen, in the presence of a hydrogenation catalyst selected from the group consisting of reduced copper silicate and oxide; and with comminuted silica as the catalyst carrier.

3. The process according to claim 2, wherein said catalyst consists of a mixture of 4 parts reduced copper and 1 part alumina.

4. The process of preparing an olefine from an alpha, beta-unsaturated aldehyde of the type

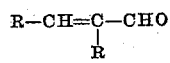

wherein R represents hydrogen, alkyl and aryl, which comprises converting one of said aldehydes to the vapor phase, intimately mixing the vapors of said aldehyde with from 1 to 20 times the stoichiometric amount of hydrogen, and passing said mixture at a temperature between 150° C. to 350° C. over a catalyst selected from the group consisting of reduced copper silicate and oxide admixed with a dehydrating agent selected from the group consisting of alumina, silica, thorium oxide, tin dioxide, inorganic sulfates, sulfates of organic amines, zinc chloride, aluminum silicate, graphite, aluminum phosphate, phosphorus pentoxide, boric anhydride, sulfuric acid and sulfonic acids.

5. The process of preparing ethyl hexene, which comprises converting ethyl-propyl-acrolein to the vapor phase, intimately mixing the vapors with 5 times the stoichiometric amount of pure hydrogen, passing said mixture at a temperature of 250° C. and at atmospheric pressure over comminuted, reduced copper silicate as catalyst while using a feeding rate of 0.05 to 1 volume per hour of liquid ethyl-propyl-acrolein per volume of catalyst, cooling and condensing, separating the aqueous layer of the condensate, and fractionating and collecting the fraction distilling at 114° to 123° C.

6. The process of preparing ethyl hexene according to claim 5, wherein a mixture of products comprising ethyl-propyl-acrolein is converted to the vapor phase and the catalyst consists of a mixture of 4 parts of reduced copper silicate and 1 part of alumina, heated to 275° C.

(References on following page)

References Cited in the file of this patent

UNITED STATES PATENTS

| | | |
|---|---|---|
| 1,966,157 | Young | July 10, 1934 |
| 2,377,026 | Miller | May 29, 1945 |
| 2,636,057 | Cutcher et al. | Apr. 21, 1953 |

FOREIGN PATENTS

| | | |
|---|---|---|
| 350,048 | Germany | Mar. 11, 1922 |
| 407,837 | Germany | Dec. 24, 1924 |
| 538,353 | Great Britain | July 31, 1941 |